Figure 1A:
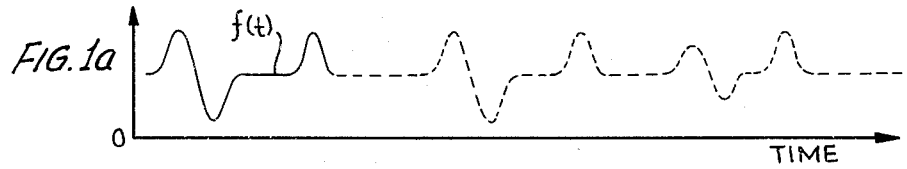

Oct. 12, 1965  J. S. SHREVE  3,211,899
DELAY LINE APPARATUS
Filed Aug. 30, 1962  2 Sheets-Sheet 1

INVENTOR
JAMES S. SHREVE
BY

Oct. 12, 1965 J. S. SHREVE 3,211,899
DELAY LINE APPARATUS
Filed Aug. 30, 1962 2 Sheets-Sheet 2

Inventor:
James S. Shreve
By: S.J. Rotondi, A.T. Dupont &
J.P. Edgerton

3,211,899
DELAY LINE APPARATUS
James S. Shreve, Arlington, Va., assignor to the United States of America as represented by the Secretary of the Army
Filed Aug. 30, 1962, Ser. No. 220,963
9 Claims. (Cl. 235—181)
(Granted under Title 35, U.S. Code (1952), sec. 266)

The invention described herein may be manufactured and used by or for the Government of the United States of America for governmental purposes without the payment to me of any royalty thereon.

This invention relates to a signal processing device, and more particularly to a delay line apparatus for modifying the time axis of time-varying functions in preselected patterns.

It is well known that there is a relation between the rate at which a signal varies and the number of samples needed to reproduce it. This relationship, according to the sampling theorem of modern communication theory, is that a wave form is completely described by a series of instantaneous amplitude values spaced at a maximum interval of ½ W seconds, where W is the upper frequency limit of the wave form sampled. More generally, any 2 WT unique pieces of information will specify a signal over an interval T seconds long.

The demonstration of the more general form of sampling theorem, that any 2 WT pieces of information are needed to characterize a signal over a T-second interval, follows from an application of the Fourier series. A band-limited function $f(t)$ over an interval T seconds long, may be expanded in a Fourier series with T as the base. Since $f(t)$ is bandlimited to W c.p.s. there is a finite number of terms in the Fourier series.

$$f(t) = \frac{c_0}{T} + \frac{2}{T}\sum_{N=1}^{WT}(a_n \cos w_n t + b_n \sin w_n t) \cdot w_n = \frac{2\pi N}{T}$$

Since W is the maximum frequency component of $f(t)$, $w_n$ has a maximum value $$w_n = 2\pi W = \frac{2\pi m}{T}$$

The maximum value of $n$ is therefore WT. Strictly speaking, of course, a band-limited signal is physically impossible to attain. All physical signals begin at some time and are zero before that time, or they are nonzero over a finite interval. The Fourier series for such physically attainable signals contain components at all frequencies, but with greatly diminished amplitudes over certain frequency ranges. However, the error involved in neglecting higher-frequency terms is in many applications negligible.

The foregoing suggests that, given a number of instantaneous samples which define a signal $f(t)$ over an interval T, the time axis of this function $f(t)$ may be changed, so that the information will be contained in a new interval T'. The frequency of each term in the Fourier series expansion of the new function would merely be changed by the ratio of $T/T'$. In a more general formulation, the time axis of a wave form $f(t)$ may be changed to produce a wave form $f(g(t))$, where $g(t)$ is the operation inherent in the particular circuit used. In the elementary cases, the wave form may for example be stretched, compressed or reversed in time.

It is an object of this invention to provide apparatus for modifying time varying signals in a preselected manner.

Another object of this invention is to provide a simple, flexible, delay line technique for modifying time-dependent electrical functions.

A still further object of this invention is to provide a delay line apparatus which will modify the time axis of a time-varying signal function without loss of the information content of the signal function.

Still another object of this invention is to provide a novel delay-line wave form sampling apparatus.

An additional object of this invention is to provide a novel correlation technique and apparatus.

Modification of time-dependent functions is accomplished in accordance with this invention by sampling a signal $f(t)$ at $n$ different times, with each of the samples separated by a time $d$. The instantaneous samples are then squeezed together, stretched apart, or otherwise rearranged in time so that some new interval, or intervals, is established between the samples. The $n$ instantaneous samples are then properly weighted and summed to form a replica of the original signal $f(t)$. If desired, the information contained in the original signal will now be contained in a new signal having a modified time axis.

In a preferred embodiment, the apparatus of this invention comprises a first tapped delay line having a delay per tap of $d_1$, and a second tapped delay line having the same number of taps, but a different delay per tap $d_2$. A signal $f(t)$ is applied to an input of the first delay line where it is stored for an interval dependent upon the length of the delay line. Gating means are provided to instantaneously sample the stored wave form, and also to simultaneously transfer the samples to a second tapped delay line. The samples in the second delay line, now spaced an interval $d_2$ apart, are properly weighted and summed. The output written in terms of the input $f(t)$ is of the general form $f(k_2(t-k_1))$, where $k_2$ is any desired positive or negative factor and $k_1$ is a fixed shift in the time axis.

Figure 1B:
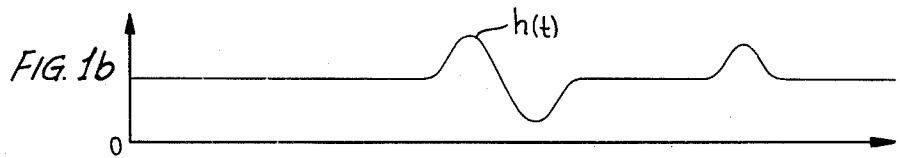
Figure 1C:
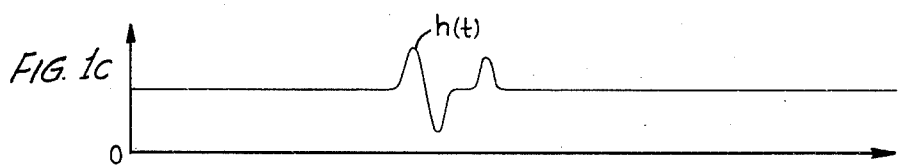
Figure 1D:
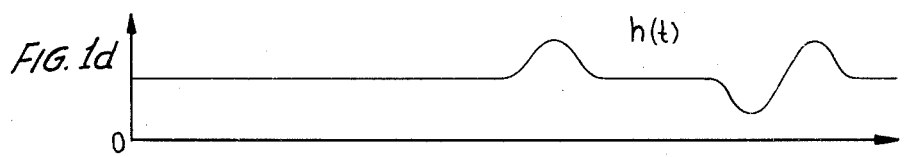
Figure 2A:
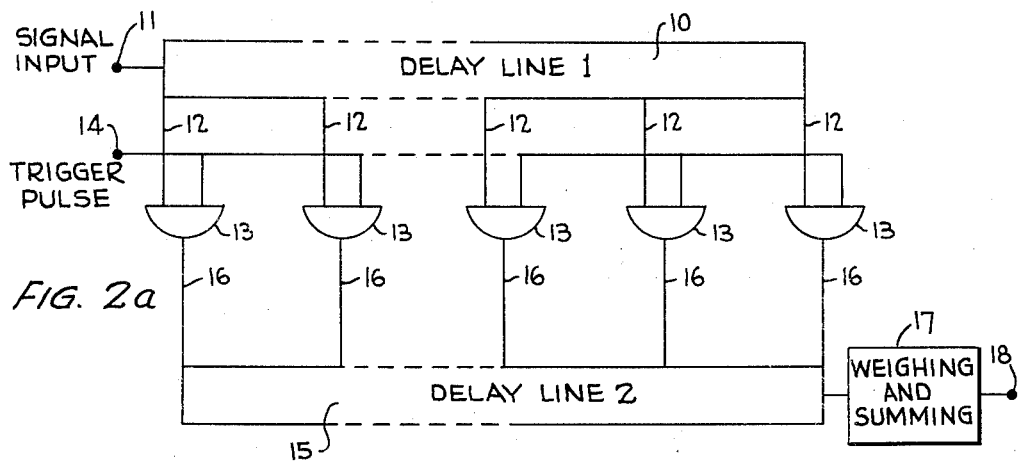
Figure 2B:
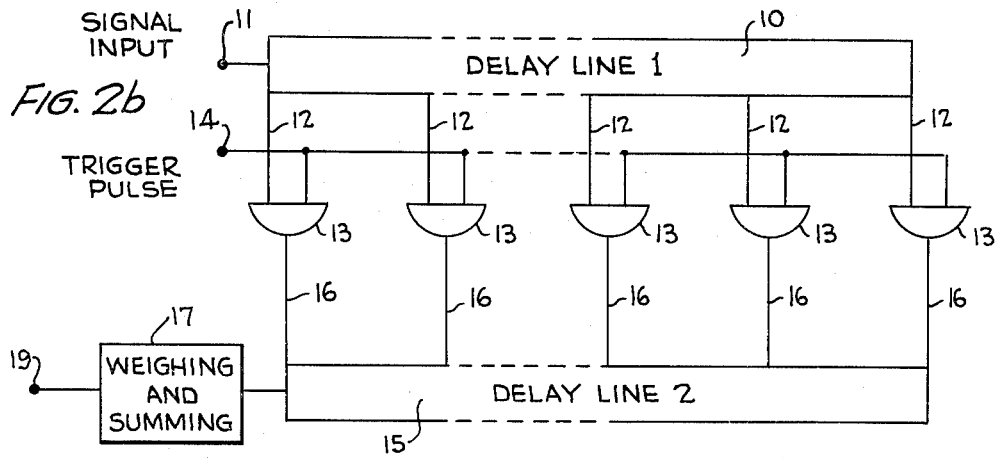
Figure 3:
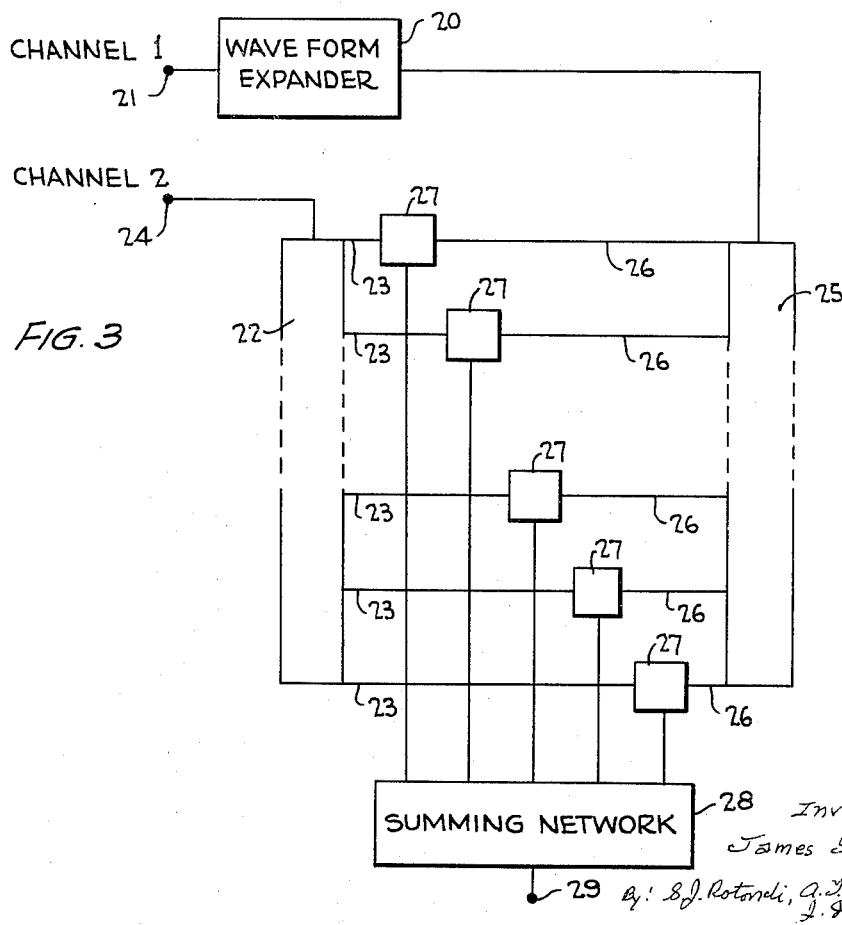

The specific nature of the invention, as well as other objects, uses and advantages thereof, will clearly appear from the following description and from the accompanying drawings in which;

FIG. 1a is a typical input signal waveform.
FIG. 1b is a typical stretched output waveform.
FIG. 1c is a typical compressed output waveform.
FIG. 1d is a stretched and reversed output waveform.
FIG. 2a shows in block diagram form an embodiment of this invention capable of producing the output shown either FIG. 1b or c.
FIG. 2b is a drawing similar to FIG. 2a, capable of producing the output shown in FIG. 1d.
FIG. 3 is a block diagram of a correlation device.

Referring to FIG. 2a, an input signal such as shown in FIG. 1a is applied to terminal 11 of a first delay line 10. Delay line 10 has a series of spaced taps 12 and a delay per tap $d_1$. The number $n$ of taps 12 on delay line 10 is such that $nd_1=T$, the time of transfer under normal conditions. Each tap 12 is connected to an AND gate 13 and at time T a narrow trigger pulse is applied at terminal 14 opening all of the AND gates 13 simultaneously for the duration of the pulse. This of course results in a simultaneous sampling of the input wave form from time $t=0$ to time $t=T$, with each of the samples space an interval $d_1$ apart. These samples are then applied through taps 16 to a second delay line 15. The delay line 15 has a delay per tap $d_2$. In this manner the samples are squeezed or stretched depending upon whether $d_2$ is smaller than or greater than $d_1$. The spaced samples present in delay line 15 are then weighted and summed in a sin x/x response device 17 to give a continuous wave output such as in FIG. 1b or 1c. Typically, summing and weighting device 17 would be a low pass filter, having a cut-off frequency determined by the highest frequency in the output waveform. Of course it is not necessary that the sin x/x device 17 be located at the output of the second delay line. If desired an sin x/x device, for example a low pass filter, may be located one at the output of each gate 13, and the same result is achieved.

A mathematical analysis of the novel apparatus of FIG. 2a may be derived. It is well known that in general $$f(t) = \sum_{N=-\infty}^{\infty} f\left(\frac{N}{2W}\right) \frac{\sin 2\pi w(t-n/2B)}{2\pi w(t-n/2B)} \quad (2)$$

where $f(n/2W)$ is a series of samples spaced an interval of ½ W seconds apart, and $f(t)$ is limited to a frequency band of W c.p.s. Mathematically Equation 2 indicates that each sample is to be multiplied by a sin $x/x$ weighting factor centered at the sample's time of occurrence, and the resultant terms summed. This of course is exactly what is done when the samples are passed through an ideal low-pass filter cutting off at W c.p.s.

The expression for the output waveform appearing at terminal 18 of FIG. 2a in terms of the input $f(t)$ applied at terminal 11 is derived as follows. The pulse appearing at the output of the $i$th gate will have an amplitude given by $$(a_i = f(T - id_1) \quad (3)$$

where T is the time of transfer, and $d$ is the delay per tap of the first delay line.

With the system configuration of FIG. 2a the output at the terminal 18, $h(t)$, will be $$h(t) = \sum_{i=0}^{N} a_i \frac{\sin p(t-T-(n-i))d_2}{p(t-T-(n-i))d_2} \quad (4)$$

where $(\sin pt)/pt$ is the filter response to a pulse, $d_2$ is the delay per tap of the second line, and $n$ is the number of taps in each line excluding input. The first delay line has a signal storage time of $nd_1$, and the transfer pulse is applied at $T = nd_1$. Noting this, and substituting Equation 3 in Equation 4, we obtain $$h(t) = \sum_{j=0}^{N} f(jd_1) \frac{\sin p(t-jd_2-T)}{p(t-jd_2-T)} \quad (5)$$

where $j = (n-i)$.

The sin $pt/pt$ device 17 may be designed to have a response, $p = \pi/d_2$. The output expression then becomes $$h(t) = \sum_{j=0}^{N} f(jd_2 \times d_1/d_2) \frac{\sin\left[\frac{\pi(t-T)}{d_2} - j\pi\right]}{\frac{\pi(t-T)}{d_2} - j\pi} \quad (6)$$

In order to write Equation 6 in a more easily recognized form, new variables $t'$, a constant $k_2$, and a function S are defined as follows:

$$t' = t - T \quad (7)$$
$$k_2 = d_1/d_2 \quad (8)$$

and $$S(x) = f(k_2 x) \quad (9)$$

Substituting these into Equation 6

$$h(t) = \sum_{j=0}^{N} S(jd_2) \frac{\sin[2\pi(\frac{1}{2}d_2)t' - j\pi]}{2\pi(\frac{1}{2}d_2)t' - j\pi} \quad (10)$$

By inspection it can be seen that the right hand side of Equation 10 is simply $S(t')$.

From the above, and from the definitions (7) and (9)

$$h(t) = S(t') = f(k_2 t') = f(k_2(t-T))$$

or letting $$k_1 = T$$
$$h(t) = f(k_2(t-k_1))$$

Several things may be noted concerning the output $f(k_2(t-k_1))$. The term $k_1$ is a delay of the output wave form resulting from the storage time in the first delay line. Also the loss of any of the higher frequency components in the original signal $f(t)$ will be caused by the finite spacing of the taps of the first delay line, and as a practical limitation in the (sin $x/x$) device. However, in many applications the loss of these higher frequency components may be either desirable, inconsequential, or unobjectionable.

Referring to FIG. 2b there is shown a device capable of producing the wave form shown in FIG. 1d. The device of FIG. 2b is in most respects identical to that described in connection with FIG. 2a, and like reference numerals have been used throughout. The device of FIG. 2b makes use of the well known principle that a signal induced in a delay line, such as delay line 15, will propagate in both direction simultaneously. With this in mind, the output 19 from the second delay line 15 of FIG. 2b is taken from the end which is closest in time to the input signal. The resultant output is of the general type shown in FIG. 1d, that is, modified in time and reversed. A further possibility with the apparatus of FIG. 2 is non-linear operation. Tap spacing on the first delay line 10 need not be constant, and irregular tap spacing will give rise to a non-linear time scale alteration.

Referring now to FIG. 3 there is shown in block diagram form a novel correlation device using the time axis modification device of FIG. 2.

The general correlation function is given by:

$$Pxy(\delta) = \lim_{T \to \infty} 1/T \int_0^T x(t)y(t-\delta)dt \quad (11)$$

where $Pxy(\delta)$ is the general correlation function, $x(t)$ is a time varying function and $y(t)$ is another time varying function. Generally speaking the experimental correlation function of two random signals can never be exactly determined in practice since an infinite integration is indicated, as is a continuum of values $\delta$. In practice, only finite integration times are employed, and in the prior art $P(\delta)$ is usually evaluated at discrete value of $\delta$.

An approximate correlation function may be obtained by multiplying an incoming signal of lentgh T by a corresponding signal which has been delayed slightly. The instantaneous product is averaged over the length T, and this process of multiplication and averaging is then repeated for a series of different relative delay times. The output of the multiplier averager plotted against the relative delay time is the correlation function desired. Employing the time axis modification device described in connection with FIG. 2a, the correlation function may be evaluated continously over the finite interval T.

Referring specifically to FIG. 3, an input signal $f(t)$ is applied to a first channel at terminal 21 of a time axis modification device 20 which has an output, written in terms of the input, of the general form, $f(k_2(t-k_1))$. The time axis modification device 20 will be of the type shown in FIG. 2a. A second, or comparing signal, $g(t)$ is applied to a second channel at input terminal 24 of comparing delay line 22 which has a series of spaced tape 23. The function $f(t)$ after modification in the device 20 is applied to a comparing delay line 25 having a series of tape 26 spaced throughout its length. Correspondingly positioned taps, 23 and 26, form sampling pairs. Associated with each pair of taps is a nonlinear device 27 which forms a product of the applied input amplitudes. The output products of the multipliers 27 are added in a summing network 28 and the correlation function of the applied inputs $f(t)$ and $g(t)$ appears at the output terminal 29.

With the input $f(t)$ applied at terminal 21 the output of wave form modifier 20 is $f(k_2(t-k_1))$. The second input $g(t)$ is applied to the delay line 22 which has a delay per tap of $d$. The delay line 25 has a delay per tap of $k_2d$ in order to maintain the same tap spacing in terms of original wave form timing.

The amplitude products from the multiplier 27 will be of the type $$f(k_2(t-k_1-d)) \cdot g(t-k_2d),$$

$$f(k_2(t-k_1-2d)) \cdot g(t-2k_2d)$$

etc.

The output from the summation network 28 is therefore $$q(t) = \Sigma f(k_2(t-k_1) - ik_2) \cdot g(t - ik_2 d) \quad (12)$$

Since correlation is a function of a time shift $d$ of one function relative to the other, if the delay lines are long enough to contain all of the input signal for the region of interest, Equation 12 is the equivalent of the discrete correlation function $$P(\delta) = \Sigma f(\delta - ik_2 d) \cdot g(-ikd)$$

with $$\delta = k_2(t-k_1) - t$$

It will be apparent that the embodiment shown is only exemplary and that various modifications can be made in construction and arrangement within the scope of the invention as defined in the claims.

I claim as my invention:

1. Apparatus for operating on an electrical signal having a waveform $f(t)$ and a time duration not greater than a fixed value $T_A$, to obtain a time-axis-modified delayed approximation of the original signal, said apparatus comprising:
   (a) a first delay line having a plurality of time-spaced connection points, the maximum delay between the two extreme connection points being $T_A$,
   (b) a second delay line having a plurality of time-spaced connection points, the maximum delay between the two extreme connection points being $T_B$,
   (c) means for injecting the waveform of interest into one of the two extreme connection points of said first delay line,
   (d) means for momentarily and simultaneously connecting each of the connection points of said first delay line to the corresponding connection points of said second delay line and for thereby simultaneously introducing into said second delay line a plurality of samples of the waveform in said first delay line,
   (e) means for taking an output signal from one of the two extreme connection points of said second delay line, and
   (f) means to weight and sum said output signal.

2. The invention according to claim 1 wherein said means to weight and sum is a low-pass filter connected to operate on said output signal.

3. The invention according to claim 2 wherein $T_B$ is greater than $T_A$ so that the output signal from said low-pass filter is a stretched approximation of the input signal to said first delay line.

4. The invention according to claim 2 wherein $T_B$ is less than $T_A$ so that the output signal from said low-pass filter is a compressed approximation of the input signal to said first delay line.

5. The invention according to claim 2 wherein said output signal is taken from the extreme connection point of said second delay line corresponding to the connection point of said first delay line into which the waveform of interest is injected, so that the leading edge of the output waveform corresponds to the leading edge of the original input waveform.

6. The invention according to claim 2 wherein said output signal is taken from the extreme connection point of said second delay line that does not correspond to the connection point into which the waveform of interest is injected, so that the leading edge of the output waveform corresponds to the trailing edge of the original input waveform.

7. The invention according to claim 2 wherein the time spacing between said connection points of said first delay line is ½ W where W is the highest order frequency component in the original electrical signal.

8. Apparatus adapted to measure the correlation between first and second nonrecurrent electrical signals over a time interval T, comprising:
   (a) a first input terminal adapted to receive said first signal,
   (b) a first tapped delay line having an input end and having a delay per tap $d$ and a total length at least T,
   (c) first means connecting said first input terminal to said input end,
   (d) a second input terminal adapted to receive said second signal,
   (e) a second tapped delay line having an input end and having a delay per tap $k_2 d$ and a total length at least $k_2 T$,
   (f) second means connected to said second input terminal for operating on said second signal to obtain a modified version of said second signal, said modified version corresponding in waveform to said second signal but having its time axis multiplied by a constant $k_2$, the output of said second means connected to the input end of said second tapped delay line.
   (g) a plurality of multiplying means, each of said multiplying means connected between a pair of corresponding taps on said first and second delay lines, and
   (h) single summing network means connected to the outputs of all of said multiplying means, for continuously summing the outputs of all of said multipliers and for delivering to a single output terminal a signal that at any instant represents the sum of the outputs of all of said multipliers at that instant.

9. The invention according to claim 8, said means for operating on said second signal comprising:
   (a) means to simultaneously obtain a plurality of instantaneous samples of said second signal, and
   (b) means connected to said sampling means to produce a replica of said input signals with a modified time axis.

References Cited by the Examiner

UNITED STATES PATENTS

| | | |
|---|---|---|
| 2,403,561 | 7/46 | Smith. |
| 2,854,191 | 9/58 | Raisbeck _____ 235—181 |
| 3,036,775 | 5/62 | McDermid et al. _____ 235—150 |

MALCOLM A. MORRISON, *Primary Examiner.*